United States Patent [19]
Thomas et al.

[11] Patent Number: 5,412,464
[45] Date of Patent: May 2, 1995

[54] APPARATUS AND METHOD FOR MONITORING LOSSES IN A BRANCHED OPTICAL FIBRE NETWORK

[75] Inventors: Glenn A. Thomas, Suffolk; Simon M. James, Woodbridge; Christopher J. Rowe, Suffolk, all of England

[73] Assignee: British Telecommunicationss public limited company, London, England

[21] Appl. No.: 949,846

[22] PCT Filed: Apr. 8, 1991

[86] PCT No.: PCT/GB91/00540
§ 371 Date: Nov. 18, 1992
§ 102(e) Date: Nov. 18, 1992

[87] PCT Pub. No.: WO91/15744
PCT Pub. Date: Oct. 17, 1991

[30] Foreign Application Priority Data
Apr. 9, 1990 [GB] United Kingdom ............... 9007974

[51] Int. Cl.⁶ ........................................... G01N 21/88
[52] U.S. Cl. .............................. 356/73.1; 250/227.21
[58] Field of Search ................. 356/73.1; 250/227.21, 250/227.27

[56] References Cited
U.S. PATENT DOCUMENTS
3,551,682 12/1970 Kerhoas et al. ............. 250/227.21
4,875,772 10/1989 Gentile ........................... 356/73.1

FOREIGN PATENT DOCUMENTS
2181921 4/1987 United Kingdom .
WO90/6498 6/1990 WIPO ............................. 356/73.1

OTHER PUBLICATIONS
Patent Abstracts of Japan, vol. 14, No. 50 (P-998) (3993), 30 Jan. 1990, & JP A 1280235 (Nippon Telegr. & Teleph. Corp.) 10 Nov. 1989.
Journal of Physics D. Applied Physics, vol. 19., No. 12, Dec. 1986, The Institute of Physics, Rogers: "Distributed Optical-Fibre Sensors," pp. 2237–2255.
Electronics Letters, vol. 25, No. 2, 19 Jan. 1989; Dolfi et al: "Optical Frequency Domain Reflectometry With High Sensitivity And Resolution Using Optical Synchronous Detection With Coded Modulators," pp. 160–162.
Applied Optics, vol. 26, No. 9, 1 May 1987, Optical Society of America, Takada et al: "New Measurement System for Fault Location in Optical Waveguide Devices Based on An Interferometric Technique," pp. 1603–1606.

Primary Examiner—Vincent P. McGraw
Attorney, Agent, or Firm—Nixon & Vanderhye

[57] ABSTRACT

Apparatus is provided for detecting losses in a branched optical fibre network comprising a first optical fibre and a plurality of second optical fibres each of which is coupled to the first optical fibre. The first optical fibre constitutes a main line, and the second optical fibres constitute branch lines. The apparatus comprises launch means for launching a carrier wave into the main line, respective modulators in each of the branch lines for modulating the carrier wave in that branch line, returns for returning the modulated signals along the branch lines to the main line, and monitors for monitoring the main line for changes in the modulation of the returned signals. The modulators are such that each modulates the carrier wave differently.

20 Claims, 2 Drawing Sheets

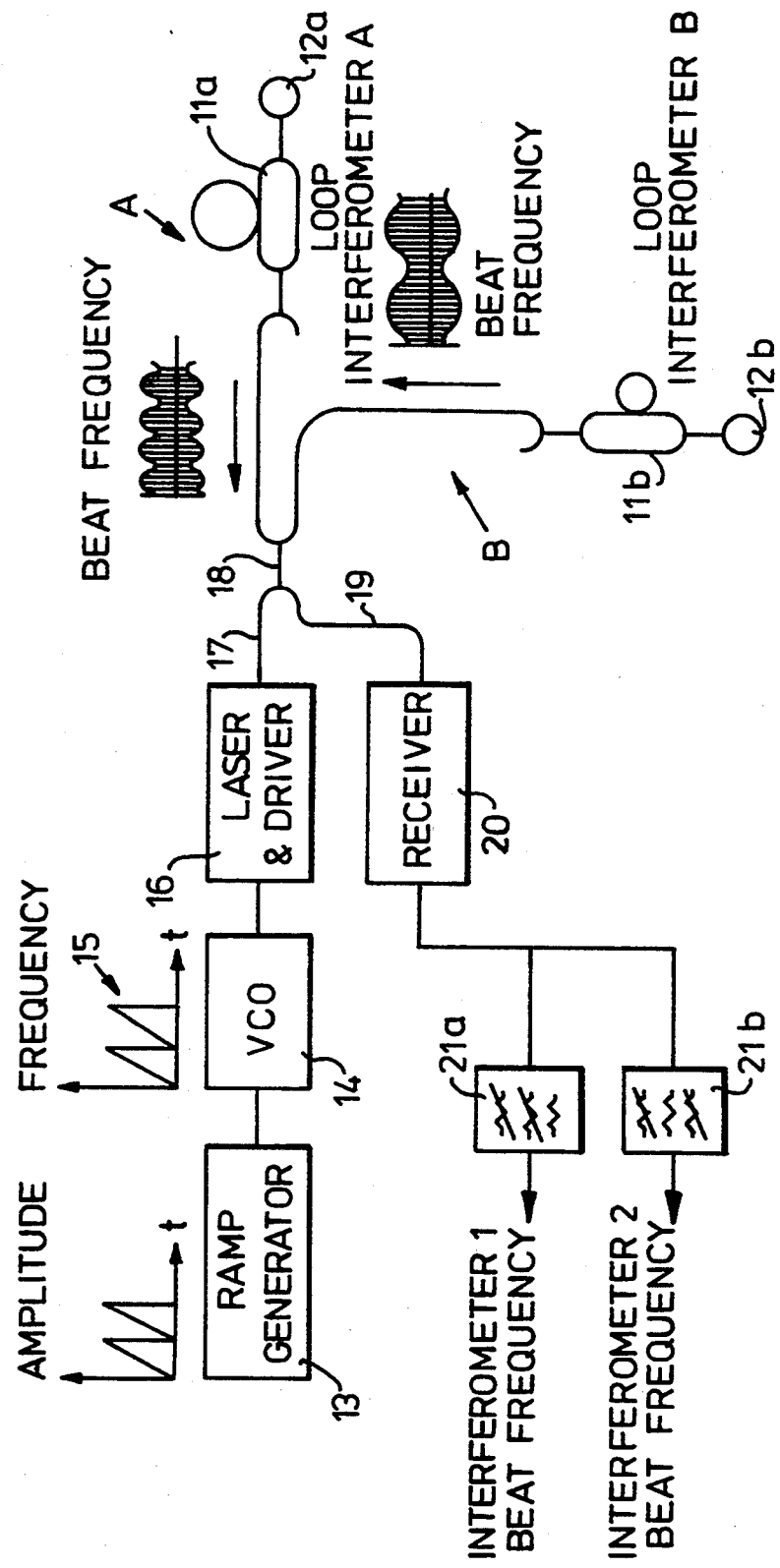

APPARATUS AND METHOD FOR MONITORING LOSSES IN A BRANCHED OPTICAL FIBRE NETWORK

BACKGROUND OF THE INVENTION

1. Field of The Invention

This invention relates to detection and measurement of losses in a branched optical fibre network.

2. Related Art

It is well known that faults in optical fibres can be located by an OTDR (optical time domain reflectometer). An OTDR launches a pulse of light into a fibre, and backscattered light is monitored for abrupt changes indicative of a fault, the time between pulse launch and the detection of the light at the launch end being indicative of the distance along the fibre that the fault occurs.

In this specification the term "optical" is intended to refer to that part of the electromagnetic spectrum which is generally known as the visible region together with those parts of the infra-red and ultraviolet regions at each end of the visible region which are capable for example of being transmitted by dielectric optical waveguides such as optical fibres.

In branched networks, it would be extremely costly to monitor each line separately from the most diversified end. It is, therefore, desirable to be able to monitor the branch lines from a centralised location, such as an exchange. If an OTDR is used, then the backscattered light from each branch line is combined on its return to the junction of the branches, and it is not possible to determine from which branch line it originated, although a distance from the pulse source is known. Also, in a branched network, the power of the outbound pulse is divided into the branch lines. Thus, the information relating to any branch line has only the optical power resulting from the backscattering from the portion of the pulse in that branch line superimposed on the information from all the other branch lines, which will decrease the resolution thereby reducing the dynamic range of the instrument and sensitivity of attenuation measurement in a particular branch line. In general, an OTDR at present has a backscatter range limitation of approximately 20 dB for a 100 ns pulse width. Thus, if the branch lines are of substantial length and/or diversity, it may not be possible to monitor the entire network by normal OTDR methods. In any event, specific branch line(s) at fault would not be identified.

The specification of our co-pending International patent application No. GB89/01454 describes a method of detecting loss in a branched optical fibre network comprising a first optical fibre and a plurality of second optical fibres each of which is coupled to the first optical fibre, the first optical fibre constituting a main line and the second optical fibres constituting branch lines, a respective reflector being associated with each of the branch lines, the method comprising the steps of launching a pulse into the main line and monitoring the main line for changes in attenuation of reflected signals returning from the reflectors.

Although this method does work satisfactorily in many branched networks, it does have disadvantages which prevent its use in all such networks. A time domain reflectometry technique has a spatial resolution that is proportional to the temporal width of the launched pulses. As a consequence, the method requires that the reflectors are spaced from the OTDR which launches pulses into the main line by distances which differ by more than about 20 to 30 m. This spatial resolution problem also restricts the number of reflectors that can be positioned in a given branch line, and the number of branch lines that can be effectively monitored. Another disadvantage of this method is that, if (as is preferred) the reflectors reflect light at different wavelengths, the loss detection signals take up a significant part of the optical spectrum, thereby restricting the amount of the spectrum available for traffic.

SUMMARY OF THE INVENTION

The aim of the invention is to provide an improved technique for monitoring the branch lines of a branched optical fibre network.

The present invention provides a method of detecting losses in a branched optical fibre network comprising a first optical fibre and a plurality of second optical fibres each of which is coupled to the first optical fibre, the first optical fibre constituting a main line and the second optical fibres constituting branch lines, the method comprising the steps of launching an optical carrier wave into the main line, modulating the carrier wave in each of the branch lines, returning the modulated signals along the branch lines to the main line, and monitoring the main line for changes in the modulation of the returned signals, wherein the carrier wave is modulated differently in each of the branch lines.

The invention also provides apparatus for detecting losses in a branched optical fibre network comprising a first optical fibre and a plurality of second optical fibres each of which is coupled to the first optical fibre, the first optical fibre constituting a main line and the second optical fibres constituting branch lines, the apparatus comprising launch means for launching an optical carrier wave into the main line, respective modulation means in each of the branch lines for modulating the carrier wave in that branch line, return means for returning the modulated signals along the branch lines to the main line, and monitoring means for monitoring the main line for changes in the modulation of the returned signals, wherein the modulation means are such that each modulates the carrier wave differently.

In a preferred embodiment, the launch means is such as to launch a linearly-ramped frequency modulated carrier wave (FMCW) into the main line. Conveniently, the launch means is constituted by a ramp generator, a voltage controlled oscillator and a laser, the output of the ramp generator being a linearly-ramped variable voltage signal which is fed to the voltage controlled oscillator, the output of the voltage controlled oscillator being used to drive the laser.

Preferably, a respective unbalanced Mach-Zehnder interferometer constitutes the modulation means for each of the branch lines, and the interferometers have different imbalances so that each interferometer produces a different beat frequency as its output. Advantageously, each of the Mach-Zehnder interferometers is constituted by a pair of optical fibres of different lengths. The optical fibres constituting each of the interferometers may be coupled into the respective branch line by means of respective couplers or WDMs at the opposite ends thereof.

In order to reduce cross talk, it is preferable for the Mach-Zehnder interferometers to be unbalanced in such a manner that their output beat frequencies are non-integer multiples of one another.

Advantageously, loop reflectors constitute the return means.

In a preferred embodiment, the monitoring means is constituted by an optical receiver for converting the returned optical signal on the main line into an electrical signal, and a plurality of filters, each of the filters being such as to filter out a modulated signal from a particular branch line. Preferably, each of the filters is a band pass filter, the pass band of which is chosen to filter out the beat frequency returned from the corresponding branch line.

BRIEF DESCRIPTION OF THE DRAWINGS

The invention will now be described in greater detail, by way of example, with reference to the accompanying drawings, in which:

FIG. 2 is a schematic diagram of a simple branched optical fibre network in which the invention may be utilised.

DETAILED DESCRIPTION OF PREFERRED EMBODIMENTS

Figure 1:
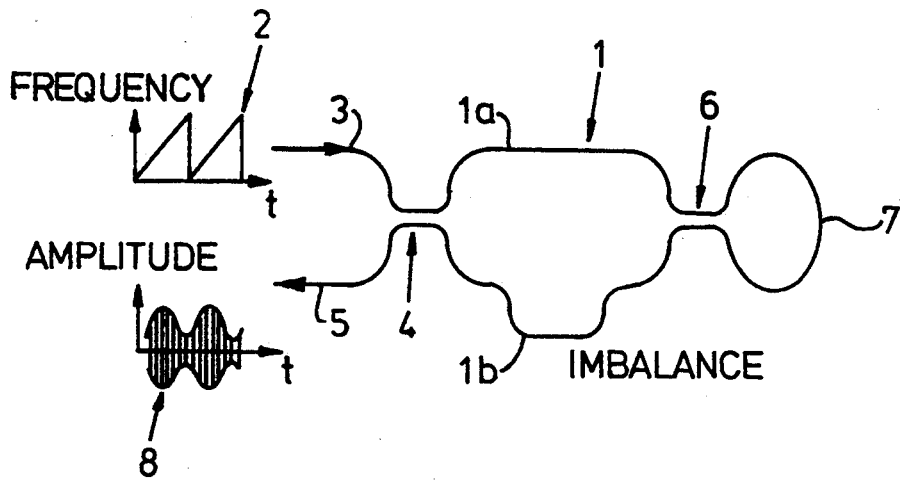
FIG. 1 is a schematic diagram illustrating the principle underlying the invention.

Referring to the drawings, FIG. 1 illustrates the principle underlying the branch identification method of the invention. This principle of branch identification is based upon the delay line effect of a Mach-Zehnder interferometer on a linearly-ramped FMCW 2. The interferometer 1 is constituted by a pair of optical fibres 1a and 1b of different lengths. The fibres 1a and 1b consequently have different optical path lengths, so that the interferometer 1 is unbalanced. The FMCW 2 is fed to the interferometer 1 via an input optical fibre 3 and a 2×2 coupler 4. The coupler 4 has two pairs of communication ports, a first port of one pair being connected to the fibre 3, and the second port of that pair being connected to an output optical fibre 5. The ports of the other pair of communication ports are connected to the optical fibres 1a and 1b. The other ends of the fibres 1a and 1b are connected to the ports of a first pair of communication ports of 2×2 coupler 6. The ports of the other pair of communication ports of the coupler 6 are connected to the opposite ends of an optical fibre which constitutes a loop reflector 7.

It is well known that a linearly-ramped FMCW signal produces a beat frequency when passed through an unbalanced Mach-Zehnder interferometer. Thus, in the arrangement shown in FIG. 1, a beat frequency is produced at the end of the interferometer 1 remote from the input fibre 3, this beat frequency being reflected back through the interferometer by the loop reflector 7, and appearing (at 8) on the output fibre 5. The frequency of this beat is dependent upon the imbalance in the arms of the interferometer, and takes the form of an amplitude modulated carrier wave. The beat frequency also appears on the fibre 3 as the inverse of the beat frequency 8 on the output fibre 5.

This principle can be exploited in order to obtain a unique signal from each branch of a branched optical network, for example by installing differently unbalanced interferometers into the different branches. Once a suitable, linearly-ramped FMCW modulated laser signal is launched into the network, and the returned beat frequencies are filtered and monitored, a unique signal for each branch can be identified. A simple branched optical network of this type is shown in FIG. 2, the network having two branches A and B, each having a Mach-Zehnder interferometer 11a and 11b respectively and a loop reflector 12a and 12b respectively. The interferometers 11a and 11b have different imbalances.

A ramp generator 13 is used to produce a linearly-ramped variable voltage signal which is fed to a voltage controlled oscillator (VCO) 14, the frequency of the output signal of which is proportional to the amplitude (voltage) of its input signal. The output of the VCO is, therefore, a FMCW signal (indicated by the reference numeral 15). THE FMCW signal 15 is used to drive a laser 16 which launches a linearly-ramped FMCW optical signal into an optical fibre 17. The fibre 17 is connected to the two branches A and B by a 2×2 coupler 18. The coupler 18 has two pairs of communication ports, a first port of one pair being connected to the fibre 17, the other port of this pair being connected to an output fibre 19. The two ports of the other pair of communication ports of the coupler 18 are connected to the optical fibres of the branch lines A and B.

The output fibre 19 leads to an optical receiver 20 which converts received optical signals into corresponding electrical signals. The output of the receiver 20 (a combination of the electrical frequencies corresponding to the optical beat frequencies generated in the Mach-Zehnder interferometers 11a and 11b and returned along the branches A and B by the loop reflectors 12a and 12b) is fed to a pair of standard analogue band pass filters 21a and 21b. These filters 21a and 21b are typically higher order Butterworth band pass filters. The pass bands of the filters 21a and 21b are chosen so as to filter out a respective one of the beat frequencies, and these are dependent upon the FMCW signal, the imbalance of the associated interferometers, and the range of the frequency ramp of the FMCW signal.

In order to determine whether an optical loss occurs in a particular branch, it is necessary only to study the output waveforms of the filters 21a and 21b, for example by using oscilloscopes. An optical loss in a given branch will result in a reduction in the amplitude of the associated output waveform.

Figure 3:
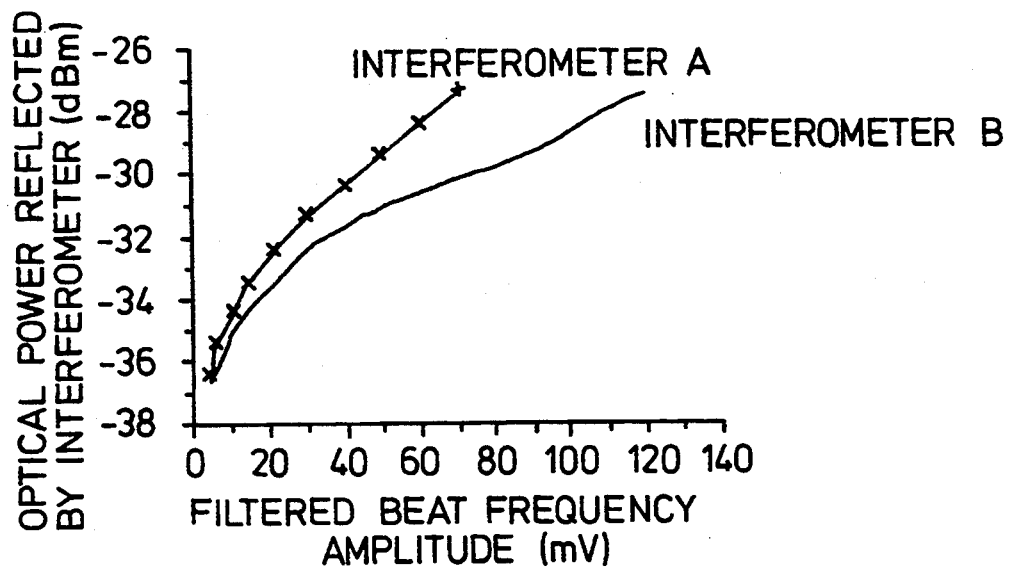
FIG. 3 is a graph illustrating how the optical loss in the branches of the network of FIG. 2 can be monitored.

If a quantitative indication of power loss is required, this can be obtained by measuring the reduction in beat frequency amplitude that occurs as a result of a given optical loss. Thus, there is an empirical relationship between beat frequency amplitude and optical loss for each of the branches A and B. This relationship is illustrated in FIG. 3.

It will be apparent that the system described above with reference to FIG. 2 could be modified in a number of ways. In particular, an optical network having a much larger number of branches could be monitored for optical losses using the delay line effect of Mach-Zehnder interferometers on a linearly-ramped FMCW. In principle, the system could be used to monitor an infinite number of branches, but in practice the number of branches is limited by the number of beat frequencies that can be filtered from the returned signal. This number can be maximised by minimising interference (crosstalk) between the different beat frequencies by making the beat frequencies non-integer multiples of one another. Moreover, in order to isolate the Mach-Zehnder interferometers from the traffic (telephony) signals so as to reduce cross talk problems, the interferometers could be made transparent to traffic signals by using taskspecific wavelength division multiplexers (WDMs) instead of the couplers 4 and 6 and an OTDR wavelength different from the traffic wavelength. Alternatively, the traffic signals could by-pass the interferometers, in which case the interferometers could be provided with filters for removing the traffic signals.

Although the interferometers are shown at the ends of the branches A and B, it would, of course, be possible to incorporate each of the interferometers anywhere in a branch. It would also be possible to provide more than one interferometer in a branch line, thereby facilitating more specific loss location in long branches.

The main advantage of the branch identification system described above is that the change in optical loss in any one of a large number of individual branches of a branched optical network can be determined using only one optical wavelength, thus freeing the remaining spectrum for user traffic. The system is also cheap, as a cheap optical receiver can be used, and the interferometers are also very cheap (being basically two simple optical couplers and two lengths of optical fibre).

We claim:

1. A method of detecting losses in a branched optical fibre network including a first optical fibre and a plurality of second optical fibres each of which is coupled to the first optical fibre, the first optical fibre constituting a main line and the second optical fibres constituting branch lines, the method comprising the steps of:
   launching a linearly-ramped FMCW optical carrier wave into the main line,
   modulating the carrier wave in each of the branch lines,
   passively returning the modulated signals along the branch lines to the main line, and
   monitoring the main line for charges in the modulation of the returned signals, wherein the carrier wave is modulated differently in each of the branch lines.

2. A method as in claim 1, wherein unbalanced Mach-Zehnder interferometers are used to modulate the carrier wave in the branch lines, the interferometers having different imbalances so that each interferometer produces a different beat frequency as its output.

3. A method as in claim 1, wherein a respective loop reflector is used to return the modulated signal from each of the branch lines.

4. A method as in claim 1, further comprising the step of filtering the different beat frequencies from the combined returned signal on the main line.

5. A method as in claim 1, wherein said modulating step is performed at the end of at least some of said branch lines just prior to performance of said returning step.

6. A method as in claim 1, wherein said modulating step is performed at an intermediate location along at least some of said branch lines substantially remote from the location where at said returning step is performed.

7. A method as in claim 1, wherein said modulating step is performed at plural spaced-apart locations along at least some of said branch lines.

8. Apparatus for detecting losses in a branched optical fibre network comprising a first optical fibre and a plurality of second optical fibres each of which is coupled to the first optical fibre, the first optical fibre constituting a main line and the second optical fibres constituting branch lines the apparatus comprising:
   launch means for launching a linearly-ramped FMCW optical carrier wave into the main line,
   respective modulation means in each of the branch lines for modulating the carrier wave in that branch line,
   return means for passively returning the modulated signals along the branch lines to the main line, and
   monitoring means for monitoring the main line for changes in the modulation of the returned signals, wherein the modulation means are such that each modulates the carrier wave differently.

9. Apparatus as in claim 8, wherein the launch means comprises:
   a ramp generator,
   a voltage controlled oscillator; and
   a laster,
   the output of the ramp generator being a linearly-ramped variable voltage signal which is connected to control the voltage controlled oscillator,
   the output of the voltage controlled oscillator being connected to drive the laser.

10. Apparatus as in claim 8,
    wherein the modulation means in each branch line comprises an unbalanced Mach-Zehnder interferometer, and
    wherein the interferometers each have a different respective imbalance so that each interferometer produces a different beat frequency as its output.

11. Apparatus as in claim 10, wherein each of the Mach-Zehnder interferometers comprises a pair of optical fibres of different lengths.

12. Apparatus as in claim 11, wherein the optical fibres included as part of each of the interferometers are coupled into the respective branch line by means of respective couplers at the opposite ends thereof.

13. Apparatus as in claim 11, wherein the optical fibres included as part of each of the interferometers are coupled into the respective branch line by means of respective WDMs at the opposite ends thereof.

14. Apparatus as in claim 10, wherein the Mach-Zehnder interferometers are unbalanced so as to cause their output beat frequencies to be non-integer multiples of one another.

15. Apparatus as in claim 8, wherein the return means comprise loop reflectors.

16. Apparatus as in claim 8, wherein the monitoring means comprises:
    an optical receiver for converting the returned optical signal on the main line into an electrical signal, and
    a plurality of filters,
    each of the filters being effective to filter out a modulated signal from a particular respectively corresponding branch line.

17. Apparatus as in claim 16, wherein each of the filters comprises a band pass filter, the pass band of which is chosen to filter out the beat frequency returned from the corresponding branch line.

18. Apparatus as in claim 8, wherein said modulation means is disposed at the end of at least some of said branch lines just prior to said return means.

19. Apparatus as in claim 8, wherein said modulation means is disposed at an intermediate location along at least some of said branch lines substantially remote from the location of said return means.

20. Apparatus as in claim 8, wherein a plurality of said modulation means are disposed at respective spaced-apart locations along at least some of said branch lines.

* * * * *